(12) United States Patent
Kim

(10) Patent No.: US 9,364,693 B2
(45) Date of Patent: Jun. 14, 2016

(54) GLASS BREAKING TOOL

(71) Applicant: Jung Sik Kim, Irving, TX (US)

(72) Inventor: Jung Sik Kim, Irving, TX (US)

( * ) Notice: Subject to any disclaimer, the term of this patent is extended or adjusted under 35 U.S.C. 154(b) by 96 days.

(21) Appl. No.: 14/285,241

(22) Filed: May 22, 2014

(65) Prior Publication Data

US 2015/0335920 A1   Nov. 26, 2015

(51) Int. Cl.
*A62B 3/00* (2006.01)
*C03B 33/12* (2006.01)

(52) U.S. Cl.
CPC ............. *A62B 3/005* (2013.01); *C03B 33/12* (2013.01); *Y10T 225/371* (2015.04)

(58) Field of Classification Search
CPC .. A62B 3/005; Y10T 225/371; Y10T 225/12; Y10T 225/307; B60R 2022/328; B60R 22/32
USPC ............. 225/103, 2, 94; 29/527.1; 7/158; 30/367, 366, 277, 368, 358, 359, 361
See application file for complete search history.

(56) References Cited

U.S. PATENT DOCUMENTS

| | | | | |
|---|---|---|---|---|
| 4,469,249 A | * | 9/1984 | Malpas | B67D 3/047 220/277 |
| 4,693,403 A | * | 9/1987 | Sprouse | C03B 33/12 125/23.01 |
| 5,584,219 A | * | 12/1996 | Dunn | A62B 3/00 225/103 |
| 5,791,056 A | * | 8/1998 | Messina | A62B 3/005 30/361 |
| 6,412,384 B1 | * | 7/2002 | Iwao | B09B 3/0058 30/366 |
| 6,418,628 B1 | * | 7/2002 | Steingass | A62B 3/005 30/366 |
| 2003/0089755 A1 | * | 5/2003 | Peers-Smith | A62B 3/005 225/103 |
| 2005/0082331 A1 | * | 4/2005 | Yang | A62B 3/005 225/2 |
| 2010/0301088 A1 | * | 12/2010 | Purdy | A62B 3/005 225/103 |
| 2013/0227795 A1 | * | 9/2013 | Franken | A62B 3/005 7/158 |

FOREIGN PATENT DOCUMENTS

KR   WO 2011/052912 A2 *   5/2011   ............. A62B 3/005

* cited by examiner

*Primary Examiner* — Ghassem Alie

(74) *Attorney, Agent, or Firm* — Sul Lee PLLC

(57) ABSTRACT

A glass breaking tool for breaking glass mounted in a window, may include an attachment plate for attaching the glass breaking tool to an interior wall adjacent to the glass and a sliding shaft cooperating with the attachment plate to rotate and extend and retract with respect to the attachment plate in order to break the glass. The sliding shaft may include a cutting edge to break the glass.

5 Claims, 4 Drawing Sheets

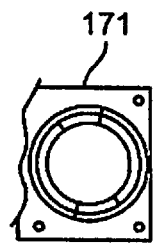
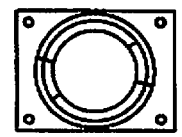
FIG. 14　　　　　FIG. 15
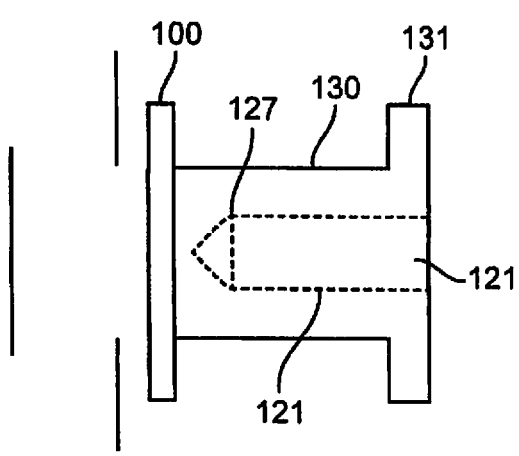
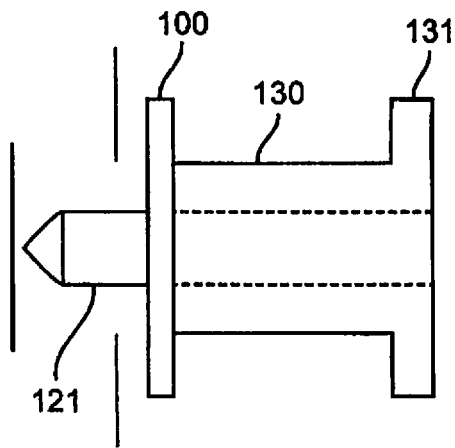
FIG. 16　　　　　FIG. 17
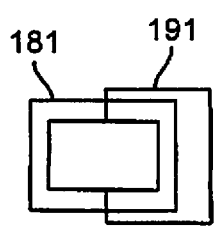
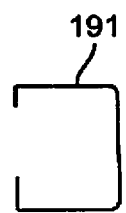
FIG. 18　　FIG. 19　　FIG. 20

GLASS BREAKING TOOL

FIELD OF THE INVENTION

The present invention relates to tools and more particularly to a glass breaking tool.

BACKGROUND

Or some uses, it is necessary to provide glass which is strong and resilient to breaking. One such use is in automobiles, trucks, buses, and all kinds of vessels. The glass in these vehicles are subject to strong influences and must be resilient to breaking. However, this feature is not desirable in all circumstances. For instance, after an accident, it may be desirable for the glass to be broken in order that the occupants of the vehicle in the accident can escape. This is especially important when the vehicle has entered the water or is subject to fire. Under these circumstances, it is imperative that the glass be broken for the occupants to escape unharmed.

In the past, a hammer or hatchet may be provided in order to allow the occupants to break the glass of the vehicle. However, the occupants may not have sufficient strength in order to break the glass of the vehicle. This is especially true when the occupants a be small children or when the vehicle is submerged where the pressure of the water acts to strengthen the glass.

What is required is a glass breaking tool which is readily available and requires minimal strength in order to operate.

SUMMARY

A glass breaking tool for breaking glass mounted in a window, may include an attachment plate for attaching the glass breaking tool to an interior wall adjacent to the glass and a sliding shaft cooperating with the attachment plate to rotate and extend and retract with respect to the attachment plate in order to break the glass.

The sliding shaft may include a cutting edge to break the glass.

The sliding shaft may be threadably connected to a connecting cylinder.

The sliding shaft may be threadably connected to a handle sleeve.

The handle sleeve may be connected to a pivoting handle.

The sliding shaft may rotate with the handle sleeve to move between the first position and the second position.

BRIEF DESCRIPTION OF THE DRAWINGS

The invention may be understood by reference to the following description taken in conjunction with the accompanying drawings, in which, like reference numerals identify like elements, and in which:

FIG. 14 illustrates an end view of the retaining plate of the present invention;

FIG. 15 illustrates an end view of the retaining plate of the present invention;

FIG. 16 illustrates a cross-sectional view of the sliding shaft in a first position;

FIG. 17 illustrates a cross-sectional view of the sliding shaft in a second position;

FIG. 18 illustrates the cover and pin device of the present invention;

FIG. 19 illustrates a side view of the cover of the present invention;

FIG. 20 illustrates a side view of the pin device of the present invention;

DETAILED DESCRIPTION

The present invention may be used during an emergency of a vessel, vehicle or train to escape by breaking glass fast and easily. During an emergency, there is a greater risk when many people gather near an emergency exit. Using the tool of the present invention, anyone can break the glass in a short amount of time for example 10 seconds and exit. This can prevent the loss of many lives such as occurred during the Sewol vessel accident in Korea.

Currently, buses and trains have a system to open windows by turning a opening handle and pushing the window. But in the case of an accident in water, it may not be easy to open the window due to water pressure. The tool of the present invention is easy to use and affordable.

The tool of the present invention can be easily installed in all vehicles vessels, trains or anywhere else where the window is installed. The present invention can function on tempered glass and tempered laminated glass regardless of the glass thickness. The tool of the present invention can be retrofitted into vehicles already being operated. The tool of the present invention provides a cost-effective solution as compared with the current emergency exit systems. The present invention is safer than breaking the glass by using a hammer and may require as little as 25 pounds of force to break the glass. The present invention is useful when an accident occurs in water. For the safety of children, a safety cover and pin may be installed. By adjusting the length of the tool, the tool of the present invention can be installed into any existing window.

Figure 1:
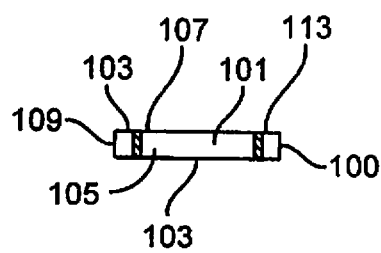
FIG. 1 illustrates a side view of the attachment plate of the present invention.

FIG. 1 illustrates a side view of the attachment plate 100 of the present invention, and the attachment plate 100 may be used to attach to an interior wall adjacent to glass. The attachment plate 100 may include a top surface 101 opposed to a bottom surface 103 which may be connected to a front surface 105 and a back surface 107 and which may be connected to a pair of opposing side surfaces 109. The attachment plate 101 may include a rectangular cross-section or other shapes. The back surface 107 may be a mirror of the front surface 105. The peripheral walls which define the center aperture 111 may be threaded in order to connect to the connecting cylinder 130 (not shown in FIG. 1 or FIG. 2).

Figure 2:
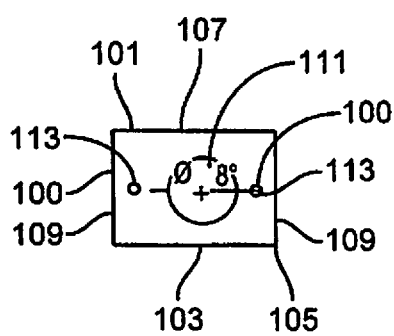
FIG. 2 illustrates a top view of the attachment plate of the present invention.

FIG. 2 illustrates a top view of the attachment plate 100 of the present invention, and the attachment plate 100 may be used to attach to an interior wall adjacent to glass. The attachment plate 100 may include a top surface 101 opposed to a bottom surface 103 which may be connected to a front surface 105 and a back surface 107 and which may be connected to a pair of opposing side surfaces 109. The attachment plate 101 may include a rectangular cross-section or other shapes. The back surface 107 may be a mirror of the front surface 105 and the bottom surface 103 may be a mirror of the top surface 101.

The attachment plate 101 may include a center aperture 111 which may extend through the top surface and the bottom surface to cooperate with the striking shaft 121 (not shown in FIGS. 1 and 2). In addition, the attachment plate 101 may include mounting apertures 113 which may extend through the top surface and the bottom surface to mount the attachment plate 101.

Figure 3:
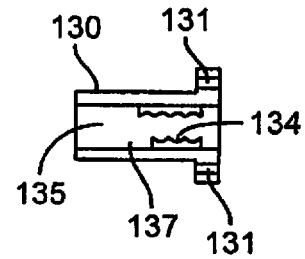
FIG. 3 illustrates a cross-sectional view of the connecting cylinder of the present invention.

FIG. 3 illustrates a cross-sectional view of the connecting cylinder 130 which may include a multi-sided flange 131 which may be used with a wrench tool (not shown) to tighten and threadably connect to the attachment plate 100 and which may be positioned on an end of the connecting cylinder 130. The connecting cylinder 130 may include a cylinder aperture 135 which may extend through the connecting cylinder 130 to cooperate with the sliding shaft 121. The connecting cylinder 130 may include a threaded portion 133 which may include external threads formed on the exterior surface of the connecting cylinder 130 to threadably connect to the attachment plate 100. The peripheral cylinder wall 137 may define the cylinder aperture 135. The interior surface of the peripheral cylinder wall 137 may include threads 139 to threadably connect to the sliding shaft 121.

Figure 4:
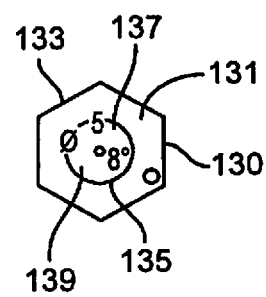
FIG. 4 illustrates an end view of the connecting cylinder of the present invention.

FIG. 4 illustrates an end view of the connecting cylinder 130 which may include a multi-sided flange 131 which may be used with a wrench tool (not shown) to tighten and threadably connect to the attachment plate 100 and which may be positioned on an end of the connecting cylinder 130. The connecting cylinder 130 may include a cylinder aperture 135 which may extend through the connecting cylinder 130 to cooperate with the sliding shaft 121. The connecting cylinder 130 may include a threaded portion 133 which may include external threads formed on the exterior surface of the connecting cylinder 130 to threadably connect to the attachment plate 100. The peripheral cylinder wall 137 may define the cylinder aperture 135. The interior surface of the peripheral cylinder wall 137 may include threads 139 to threadably connect to the sliding shaft 121.

Figure 5:
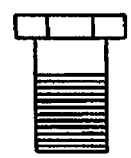
FIG. 5 illustrates a side view of the connecting cylinder of the present invention.

FIG. 5 illustrates a side view of the connecting cylinder 130 which may include a multi-sided flange 131 which may be used with a wrench tool (not shown) to tighten and threadably connect to the attachment plate 100 and which may be positioned on an end of the connecting cylinder 130. The connecting cylinder 130 may include a cylinder aperture 135 which may extend through the connecting cylinder 130 to cooperate with the sliding shaft 121. The connecting cylinder 130 may include a threaded portion 133 which may include external threads formed on the exterior surface of the connecting cylinder 130 to threadably connect to the attachment plate 100. The peripheral cylinder wall 137 may define the cylinder aperture 135. The interior surface of the peripheral cylinder wall 137 may include threads 139 to threadably connect to the sliding shaft 121.

Figure 6:
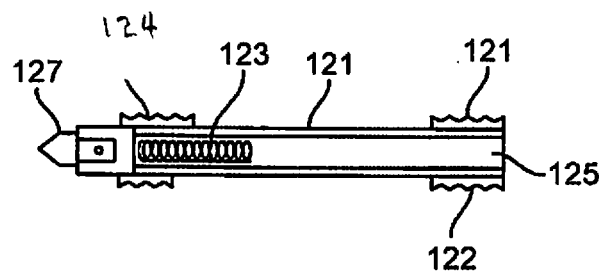
FIG. 6 illustrates a cross-sectional view of the sliding shaft of the present invention.

FIG. 6 illustrates a cross-sectional view of the sliding shaft 121 which may cooperate with the cylinder aperture 135 of the connecting cylinder 130 (not shown in FIG. 6) and which may include a shaft aperture 125 which may extend through the sliding shaft 121. The biasing device 123 which may be a spring may cooperate with the shaft aperture 125 and may be positioned within the shaft aperture 125. The biasing device 131 may provide a biasing force for the pivoting handle 151 (not shown). One end of the sliding shaft 121 may be connected to a shaft blade 127 which may include a cutting edge which may define a point in order to facilitate the breaking of glass.

FIG. 6 additionally illustrates that the sliding shaft 121 includes a first threaded portion 122 which may include threads formed on the exterior of the sliding shaft 121 and an end of the sliding shaft 121 to cooperate with the handle sleeve 161 and includes a second threaded portion 124 which may include threads formed on the exterior of the sliding shaft 121 positioned adjacent to the shaft blade 127 to cooperate and connect with the connecting cylinder 130.

Figure 7:
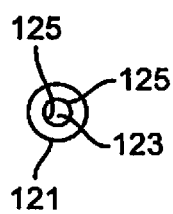
FIG. 7 illustrates an end view of the sliding shaft of the present invention.

FIG. 7 illustrates an end view of the sliding shaft 121 which may cooperate with the cylinder aperture 135 of the connecting cylinder 130 (not shown in FIG. 6) and which may include a shaft aperture 125 which may extend through the sliding shaft 121. The biasing device 123 which may be a spring may cooperate with the shaft aperture 125 and may be positioned within the shaft aperture 125. The biasing device 123 may provide a biasing force for the pivoting handle 151 (not shown). One end of the sliding shaft 121 may be connected to a shaft blade 127 which may include a cutting edge which may define a point in order to facilitate the breaking of glass.

FIG. 6 additionally illustrates that the sliding shaft 121 includes a first threaded portion 122 which may include threads formed on the exterior of the sliding shaft 121 and an end of the sliding shaft 121 to cooperate with the handle sleeve 161 and includes a second threaded portion 124 which may include threads formed on the exterior of the sliding shaft 121 positioned adjacent to the shaft blade 127 to cooperate and connect with the connecting cylinder 130.

Figure 8:
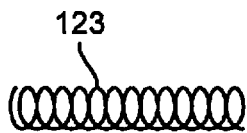
FIG. 8 illustrates a side view of the biasing device of the present invention.

FIG. 8 illustrates a perspective view of the biasing device 123 which may be a spring.

Figure 9:
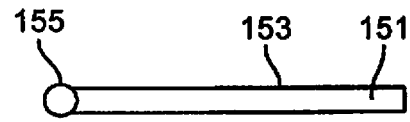
FIG. 9 illustrates a side view of the pivoting handle of the present invention.

FIG. 9 illustrates a perspective view of the pivoting handle 151 which may include a pivoting shaft 153 which may be a solid or hollow cylinder, and the pivoting shaft 153 may be connected to a sphere 155 at one end of the pivoting shaft 153.

Figure 10:
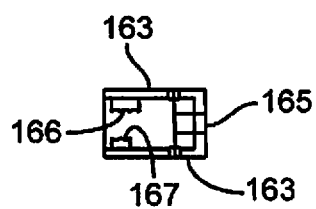
FIG. 10 illustrates a side view of the handle sleeve of the present invention.
Figure 11:
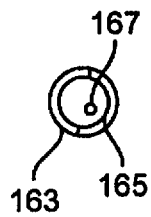
FIG. 11 illustrates an end view of the handle sleeve of the present invention.
Figure 12:
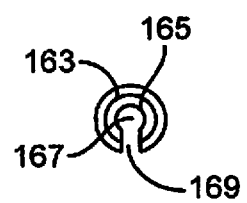
FIG. 12 illustrates a cross-sectional view of the handle sleeve of the present invention.

FIGS. 10, 11 and 12 illustrate a handle sleeve 161 which may include a sidewall 163 which may extend around the periphery of the handle sleeve 161 and which may include an end wall 165 which may connect with the sidewall 163 at only one end of the handle sleeve 161. The handle sleeve 161 may include a handle center aperture 167 which extends through the center of the handle sleeve 161 and may be terminated by the end wall 165. The end wall 165 may include a notch 169 which may extend to and down the sidewall 163. The inner surface of the sidewall 165 may include internal threads 166 to threadably connect to the threads 122 of the sliding shaft 121.

Figure 13:
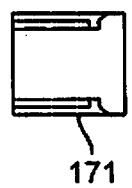
FIG. 13 illustrates a cross-sectional view of the retaining plate of the present invention.

FIGS. 13, 14 and 15 illustrate a retaining plate 171. The cross-sectional view does not appear to correspond to the end view.

FIG. 16 illustrates that the shaft blade 127 of the sliding shaft 121 is positioned withdrawn and behind the attachment plate 100 in a first position which may be a stowed position.

FIG. 17 illustrates that the shaft blade 127 of the sliding shaft 121 has been rotated in order to extend the shaft blade 127 beyond the attachment plate 100 in a second position to break glass.

FIG. 18 illustrates a cover 181 to cover the retaining plate 171 and the pin device 191 to cooperate with the cover 181.

FIG. 19 illustrates the cover 181.

FIG. 20 illustrates the pin device 191.

Figure 21:
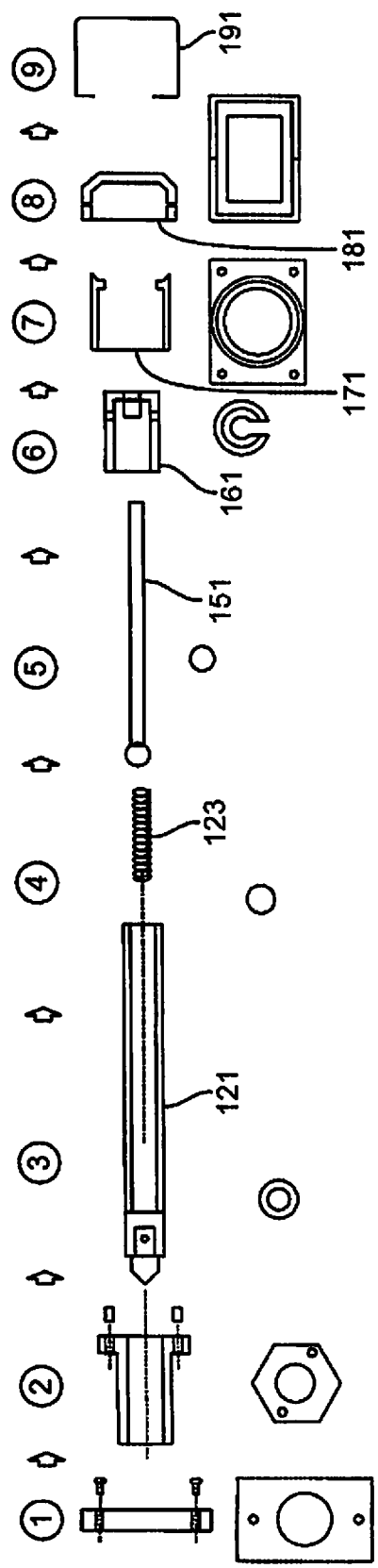
FIG. 21 illustrates an exploded view of the present invention.

FIG. 21 illustrates the attachment plate 100 which may be connected to the connecting cylinder 130 which may be threadably connected to the sliding shaft 121 which may accept the biasing device 123 to bias the pivoting handle 151 and illustrates the handle sleeve 161 which may be connected to the sliding shaft 121 and which may be connected to the retaining plate 171 which may be covered by the cover 181 which may be connected to the pin device 191.

Figure 22:
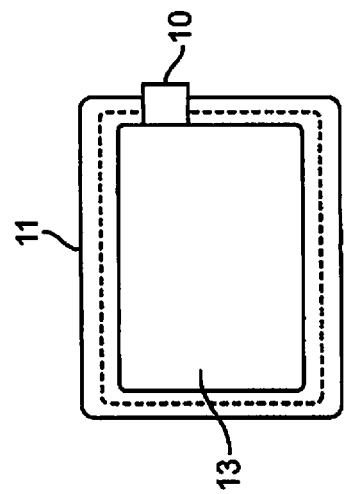
FIG. 22 illustrates a window, window frame and the glass braking device of the present invention.

FIG. 22 illustrates a window frame 11 which holds a window 13 which may extend over the window frame 11 and the glass braking device 10 which may be mounted on the window frame 11 and may extend over the window 13.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed.

The invention claimed is:

1. A glass breaking tool for breaking glass mounted in a window, comprising:
   an attachment plate configured for attaching the glass breaking tool to an interior wall adjacent to the glass, the attachment plate comprising a first aperture;
   a connecting cylinder directly connected to the attachment plate at one end, the connecting cylinder comprising a second aperture extending laterally through the connecting cylinder, the second aperture comprising a threaded interior wall; and
   a rotatable shaft comprising an external threaded portion, the rotatable shaft threadably connected to the connecting cylinder through the second aperture and configured to extend and retract through the attachment plate according to a rotation of the rotatable shaft with respect to the connecting cylinder, and further configured to break the glass in response to the rotation causing the rotatable shaft to extend through the attachment plate.

2. A glass breaking tool for breaking glass mounted in a window as in claim 1, further comprising a cutting edge at one end of the rotatable shaft such that the cutting edge is in direct contact with the glass as the rotatable shaft rotates to extend through the attachment plate.

3. A glass breaking tool for breaking glass mounted in a window as in claim 1, wherein the rotatable shaft is threadably connected to a handle sleeve.

4. A glass breaking tool for breaking glass mounted in a window as in claim 3, herein the handle sleeve is connected to a pivoting handle.

5. A glass breaking tool for breaking glass mounted in a windows as in claim 3, wherein the sliding shaft rotates with the handle sleeve to move between a first position and a second position, the first position corresponding to when the rotating shaft is retracted and the second position corresponding to when the rotating shaft is extended.

* * * * *